INVENTORS
REYNOLD B. JOHNSON
OTTO F. MONEAGLE
THEODORE D. KORANYE
HENRY A. JURGENS &
MERLE P. PRATER
BY J W Armbruster
ATTORNEY Sept. 6, 1960 R. B. JOHNSON ET AL 2,951,699
RECORD FEEDING DEVICES
Original Filed June 19, 1953 11 Sheets-Sheet 7

INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY

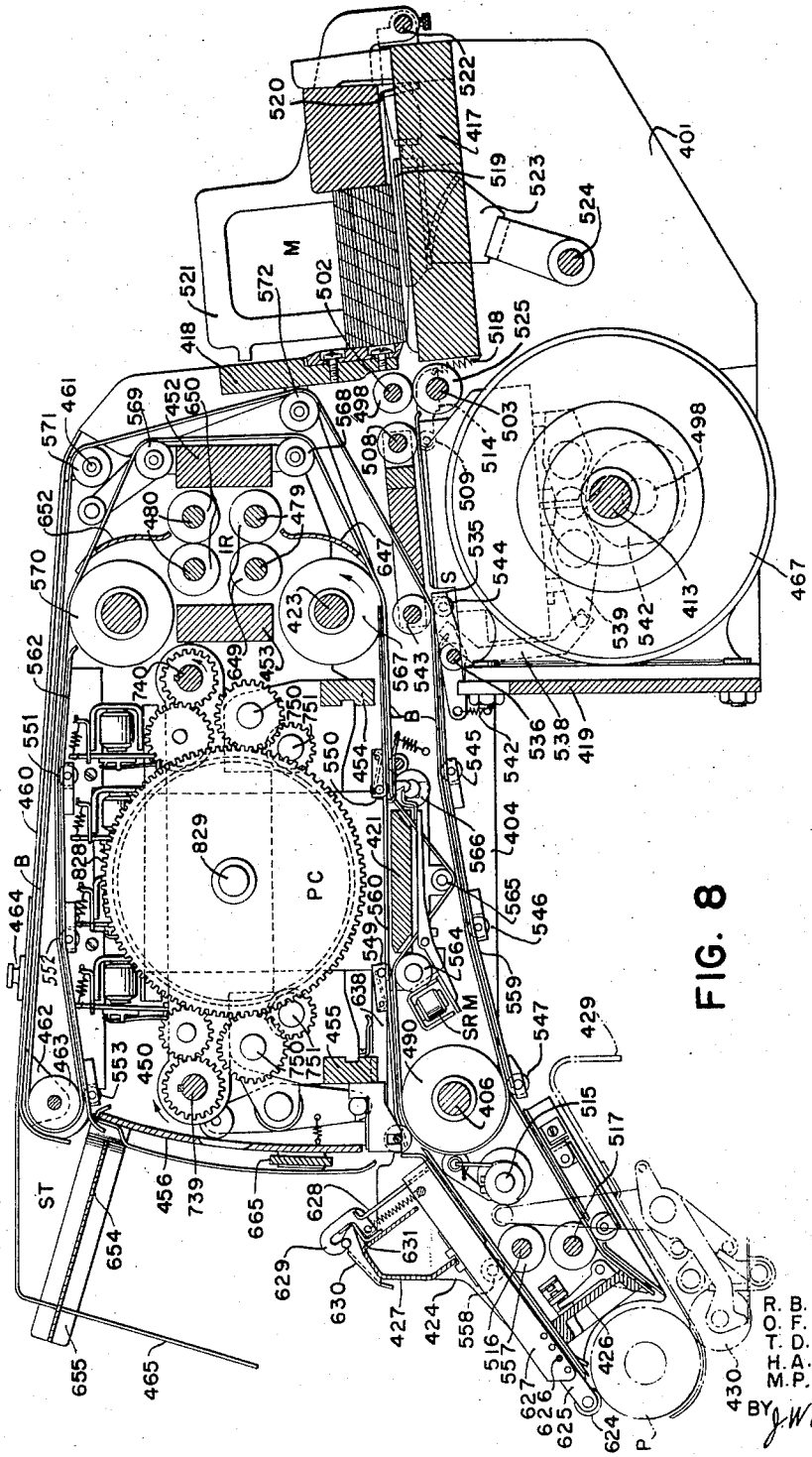

Sept. 6, 1960 R. B. JOHNSON ET AL 2,951,699
RECORD FEEDING DEVICES
Original Filed June 19, 1953 11 Sheets-Sheet 9
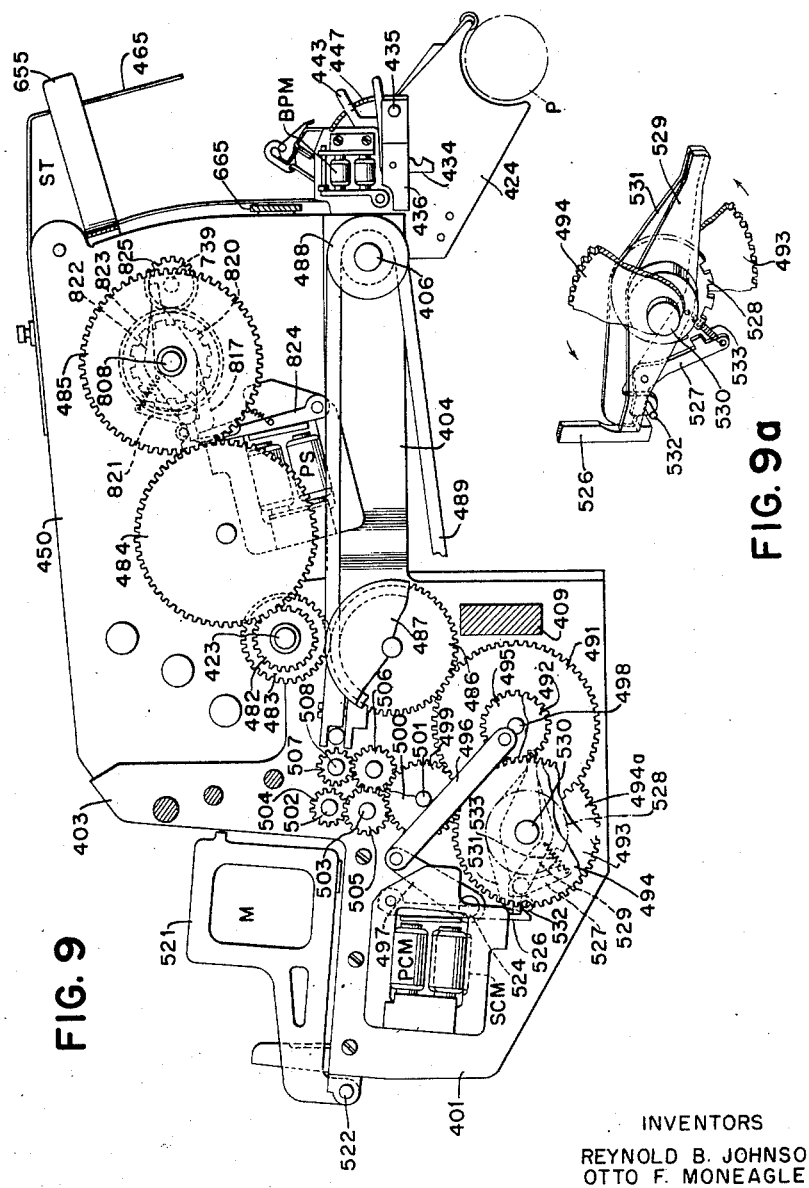
INVENTORS
REYNOLD B. JOHNSON
OTTO F. MONEAGLE
THEODORE D. KORANYE
HENRY A. JURGENS &
MERLE P. PRATER
BY J.W. Armbruster
ATTORNEY Sept. 6, 1960     R. B. JOHNSON ET AL     2,951,699
RECORD FEEDING DEVICES Original Filed June 19, 1953     11 Sheets-Sheet 10

INVENTORS
REYNOLD B. JOHNSON
OTTO F. MONEAGLE
THEODORE D. KORANYE
HENRY A. JURGENS &
MERLE P. PRATER
BY J. W. Auermeter
ATTORNEY

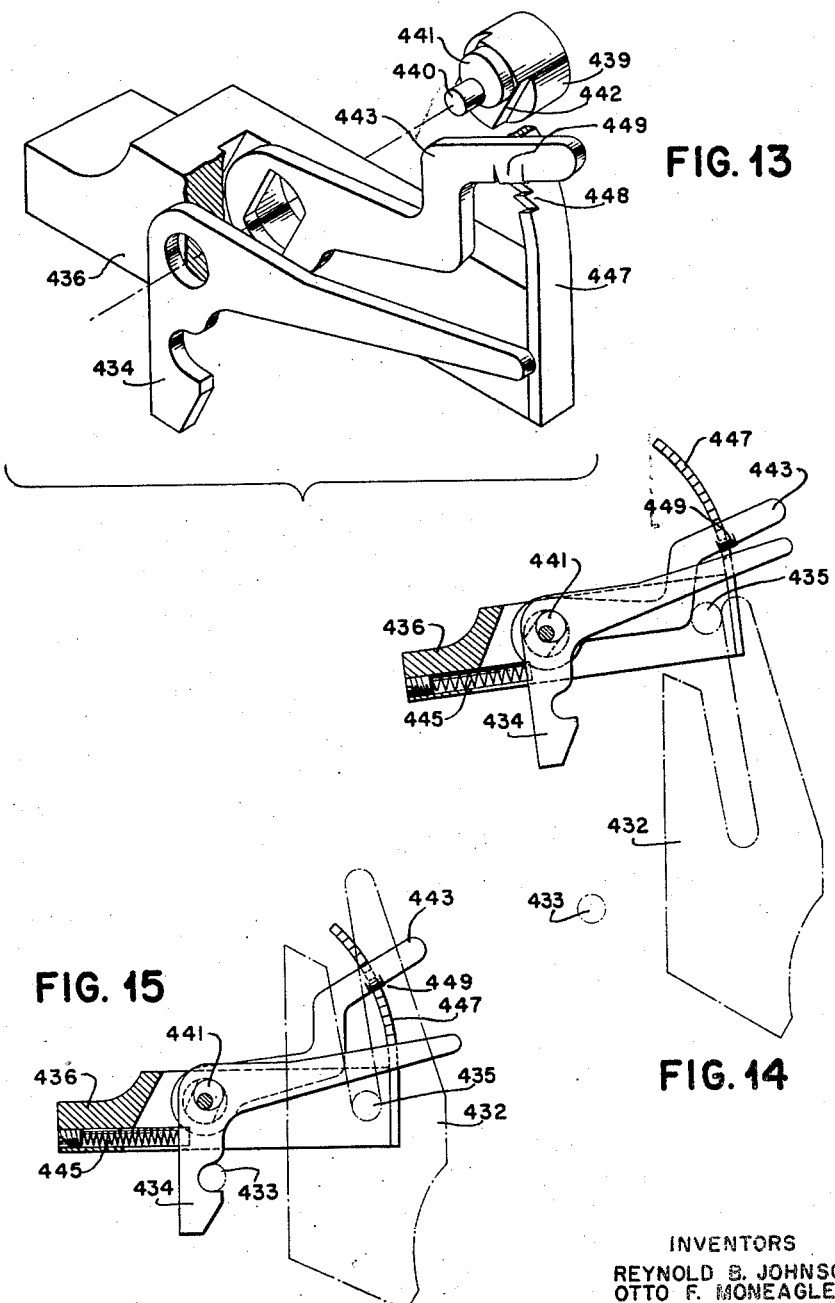

United States Patent Office 2,951,699
Patented Sept. 6, 1960

2,951,699
RECORD FEEDING DEVICES

Reynold B. Johnson, Palo Alto, Calif., and Otto F. Moneagle, Endicott, Theodore D. Koranye, Vestal, Henry A. Jurgens, Briarcliff Manor, and Merle P. Prater, Vestal, N.Y., assignors to International Business Machines Corporation, New York, N.Y., a corporation of New York Original application June 19, 1953, Ser. No. 362,711, now Patent No. 2,889,110, dated June 2, 1959. Divided and this application Jan. 14, 1958, Ser. No. 708,900

2 Claims. (Cl. 271—7)

This is a division of application Serial No. 362,711, filed on June 19, 1953, now U.S. Patent No. 2,889,110, for Bill Feeding and Piercing Devices.

This invention relates in general to record controlled accounting devices and more particularly to an improved form of sheet feeding device coordinated with means for sensing pre-punched data in the sheet, and printing address, items and total data thereon and piercing it to represent such numerical and alphabetical information.

The main object of the invention is the provision of devices for producing an improved form of bill or other accounting instrument. When the bill or the stubs thereof are pierced it is done in such a way as to leave the paper unblemished. The paper disturbed by piercing is rolled or ironed back into the plane of the paper so that index points cannot be detected by the eye.

Another object of the invention is the provision of a portable, self-driven bill feeding device. The device is constructed without a platen so that it is adapted to be wheeled around and connected to a standard printing machine and serve in connection therewith to advance record material to and from the platen. Although the record material is referred to throughout this specification as a bill, sheet, accounting element or instrument, it will be understood that in the majority of cases the record material is in the shape of the well known IBM record card and as such is either imperforate or formed with perforations before entering the bill feed device. The bill feeding device is designed to handle extra widths and lengths of record material usually in the form of two IBM cards connected side-by-side, one of which is usually a whole card and the other a card or card portion subdivided by perforated lines of weakness to sectionalize it into two or more stub sections.

Throughout this specification a distinction should be kept in mind of the difference between the original perforated data or record cards which are used to control the accounting machine as differentiated from the blank bill cards which pass through the bill feeding device and receive impressions and cuts as printed and pierced information from the data cards and the accumulators controlled thereby. The data cards are usually in the form of name and address cards and cards distinguishing items and prices of materials or services such as those provided by utility companies. The example taken to illustrate the present case is one wherein a utility company having records in the form of perforated data cards desires to send out bills to customers and also establish ledger records for home office purposes.

A feature and object of the invention is the provision of means for providing an unblemished record such as a bill or check and yet have the same contain information in the form of data indicia with weakened indicia areas. A bill record which is to be mailed out and handled by a customer has requirements more exacting than those of a record held in an accounting office. The novel record of this invention not only meets the needs by presenting a better looking bill, but it is also a bill suited for better machine control after being handled.

Another feature of the bill feeding device is its coordination with sheet feeding devices of the kind controlled by a perforated tape. Since the perforated tape has flexibility in adjusting the tabulator platen to various printing line positions, such flexibility is brought into use in connection with the advance of the bill when it passes from the bill feeding device to the platen before being drawn back into the bill feeding device.

Another object of the invention is the provision of sheet feeding controls for coordinating the positioning of a series of sheets in sequential order as they pass through a series of stations along the path of each sheet when going through the bill and sheet feeding device. As a sheet such as a ledger sheet is advanced out of the magazine, it is brought into a first sensing station wherein prepunched information therein (i.e., in one section of the sheet) is compared with one or more data cards as they pass through the tabulator. After this sensing operation, the sheet is advanced further into a position just short of the platen and there held until the proper time for an advance before taking the place of the preceding sheet on the platen. When printing of the preceding sheet is finished as revealed by the indication of a group control change in the tabulator and total printing therefrom, the new sheet is spaced to the platen and there the tape feeding controls take over, usually to advance it to the first address line print receiving position. Thereafter, the sheet is advanced from address to item and from item to total printing positions as determined by the feed control tape. After receiving all the printed information, the sheet is advanced away from the tabulator platen and back again into the sheet feeding device which conducts it to the piercing station where it is held momentarily while the punch wires descend to pierce the sheet material according to the data set up in various stages while the sheet was progressing towards the piercing station. Directly after piercing is accomplished, the sheet is carried further between sets of ironing rollers which restore the pierced material back into the plane of the sheet. After passing through the ironing rollers, the sheet is directed back towards the front of the machine where it is thrown into a stacker. The path of motion of the sheet is in the form of a letter S with the platen at one rounded part of the path and the ironing rollers at the other rounded section of the path, and the magazine and stacker at the lower and upper ends respectively.

Another object of the invention is to provide optionally employed units of mechanism for carrying on various kinds of accounting paper work such as the recording of bills, checks, ledger records, etc., in cooperation with a common handling device. In the present instance the feeding mechanism for the bill feed is adjustable to handle record materials of various lengths and widths in order to feed a range of business instruments the size of which may vary from that of a check to that of a ledger card. Although the bill feed devices include sensing, printing and piercing units, it will be understood that not all such units are used all the time. Instead they are used in combinations according to the kind of business transaction to be recorded. Therefore, although all record materials advance through the bill feeding device past the sensing station, not all have effect in connection therewith and the same is true of the printing and piercing operations.

Another object of the invention is to provide a platenless sheet feed device mounted on a cantilever extension of a frame with castors. An advantage of this construction is in the ability to roll the feed device to any of a number of tabulator printers of different kinds. The overhanging part of the sheet feed is adapted to fit over the ordinary paper table and thus bring sheets to the platen just as though they were inserted separately by hand. Attachment is made by latches with eccentric pivots on the sheet feed engaging studs on the tabulator and being drawn tight by turning the pivots. As the sheets leave the platen they are conveyed further by the sheet feed devices to piercing, ironing and stacking stations.

A further object of the invention is the provision of a bill feed device with articulated sections some of which are raised and opened for inspection and service and the part nearest the platen is adjustable to direct the flow of record material over the tabulator paper table and directly onto the platen.

A still further object of the invention is to provide a multiple belt feed drive for conveying the bill blanks or cards from one station of the bill feed to another as soon as it leaves the sensing station. The belts are looped short of or detoured around the platen, piercing and ironing stations so that action around the platen is independent of the belt drive.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 8 is another elevation view of the bill feed devices in a section taken along line 8—8 in Fig. 6.

Fig. 9 is a side elevation view looking at the outside of the bill feeding device and taken along line 9—9 in Fig. 6.

Figure 9a is a detailed view showing the clutch engaging mechanism.

Fig. 13 is an exploded perspective view showing the parts for latching the bill feeding unit onto the printer.

Fig. 14 is a side elevation view showing the latching parts before they are connected.

Fig. 15 is another elevation view showing the latching parts connected to hold the bill feeding attachment onto the printer.

The tabulator used for purposes of illustration as a printing device is the one disclosed in the Rabenda Patent 2,569,829, filed on May 3, 1949 and issued on October 2, 1951.

THE MACHINE IN GENERAL

The main purpose of this specification is to point out the record feeding controls and cooperation between a novel form of bill printing and piercing device and a tabulator. The bills are in the form of cards which are sensed, pierced and printed upon in such a fashion as to have advantages over similar instruments produced heretofore.

Figure 1:
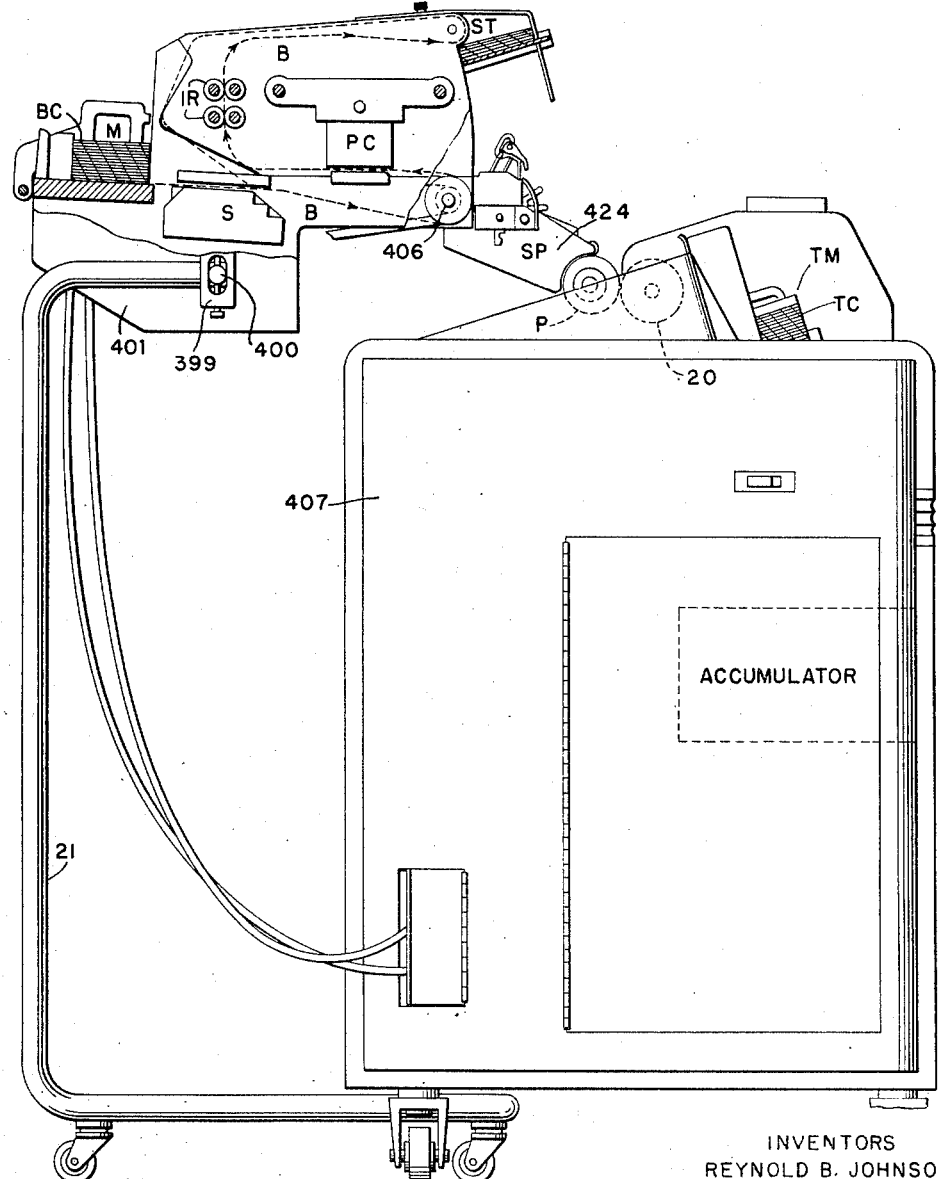
Fig. 1 is a side elevation view showing the printer and attached bill feeding unit, the latter being shown in section.

With reference to Fig. 1, a general discussion may be given of the components of the connected devices and the way they have effect upon a bill. It is noted that the tabulator 407 is designed to stand separately and has print wheels 20 for printing automatically upon thin record sheets or continuous forms at a platen P. The tabulator contains the usual components of card feeding and sensing devices for entering data into accumulating and printing mechanisms and also devices to read the totals of the accumulator and control the printer to print such totals. Then, too, in the usual fashion, the record cards TC sensed are ordinarily arranged in groups and automatic group control devices between successive sensing station, detect changes of such group and automatically initiate total taking and printing operations.

As is usual in such tabulating machines, the one side of the platen P is exposed for the insertion and removal of record sheets. In this application advantage is taken of that accessibility by wheeling into place an auxiliary feeding device which is without a platen but furnished with all the other feeding controls for bringing record or bill forms to and from the platen.

Associated with the platen in the tabulator is the usual form of tape feed controls for governing the positioning of the record while it is on the platen so that it is advanced for line spacing movements between heading and address portions to item portions and from item portions to predetermined total line positions. The tape feed controls also govern overflow detection and ejection of a record after recording thereon has been completed.

Now referring more specifically to the elements of the bill feed device which is shown at the upper left part of Fig. 1 as a sort of a cantilever extension of an L shaped frame 21 designed to be self-supporting and adapted to be wheeled into place and connected to any one of a number of tabulators or other printing devices so long as the one side of the platen P is accessible and the controls of the printer are coordinated with the controls of the bill feed device which are about to be enumerated in a general way.

The magazine M holding the blank bill records BC is seen to be at the lower left portion of the cantilever extension. These bill forms BC are usually record cards similar to those used to control the tabulator. However, they are often provided with extra stub sections and also made in various sizes to become instruments in various accounting work other than that of billing; for example, check making, ledger posting or other kinds of accounting controls may also be passed through the bill feeding device and in conjunction with the tabulator receive and impart information necessary to produce a complete accounting procedure.

Returning now to the path of motion of the bill BC through the bill feed and the various units of mechanism encountered in such path, it is noted that the first station the bill enters after leaving the magazine is a sensing station S. There, any pre-punched data such as an account identification may be sensed and compared with supposedly similar account identifications on record cards TC being sensed in the tabulator at the same time. In this way, it is definitely established that the data about to be recorded and pierced in the bill properly belongs thereon.

In Fig. 1, the dotted lines with arrows represent a conveyor belt feed for the bills to carry them from station to station. The belt is seen to describe an endless path in the shape of a U lying on its right side. The part of the belt path affecting the bill is in the shape of an S which the bill enters at the lower left side after coming out of the sensing station S.

The bill BC is carried from the sensing station S further to the right into a stopping station SP where it is held in readiness to be drawn around the platen when the platen has finished with a preceding bill. At the proper time, usually occasioned by total printing and ejection of the preceding bill, the bill at the stopping station is released and advanced and drawn part way around the platen P of the tabulator.

While at the platen P the bill BC is divorced of most of the controls of the bill feed and instead comes under the control of the printer, accumulator and tape feed advancing controls of the tabulator. It is only when the recording operations have been completed and the bill card is ejected from the platen that the bill feed devices again take over and carry the bill to the piercing station PC.

At the piercing station PC the bill BC is pierced to represent a variety of information in such a fashion as to prevent marring its appearance. This is done by piercing rather than punching the data in the record. At selected index points the record material is pushed out in the form of a flap. There is no chad or chip removed from the record. Instead the flap remains on the card and is restored back in place later in such a position as to be unnoticeable but yet have a U shaped line of weakness which is used in other machines, to either operate upon the card with the chadless index points to convert them to regular rectangular holes, or to use the chadless or chipless record to control the punching of a standard card with rectangular holes.

These chadless or chipless perforating devices at PC have another desirable constructional feature in that they are designed to set up or store received information in several fields and in different cycles before piercing in one operation. For example, the account identification may be derived from the first card passing through the tabulator and stored in the piercing unit early in a series of cycles devoted to one bill preparing operation. Later in that same series of cycles another part of the piercing mechanism may be operated to store the gross and net charge amounts for electric consumption derived from item record cards passing through the tabulator. Still later other parts of the piercing unit may be controlled from accumulators of the tabulator when they are read to take out totals indicating utility charges involving such things as merchandise bought, repairs, old balance amounts, etc. By the time the bill card reaches the piercing station and is properly situated therein all of these parts of data relating to the bill have already been set up in the storage part of the piercing unit and then in one stroke the wire piercing needles of all sections of the piercing unit descend and pierce the data into one or more sections of the bill card and stubs.

After the piercing operation at PC, the bill card is conducted further to the left and upward through two sets of ironing rollers IR which push the extending flaps of the pierced index points back into the plane of the bill card so that to all appearances it is imperforate.

The final motion of the bill is upward and to the right and then carried into a stacker ST for holding the completed bills.

*Record materials and cooperating units of mechanism*

Figure 2:
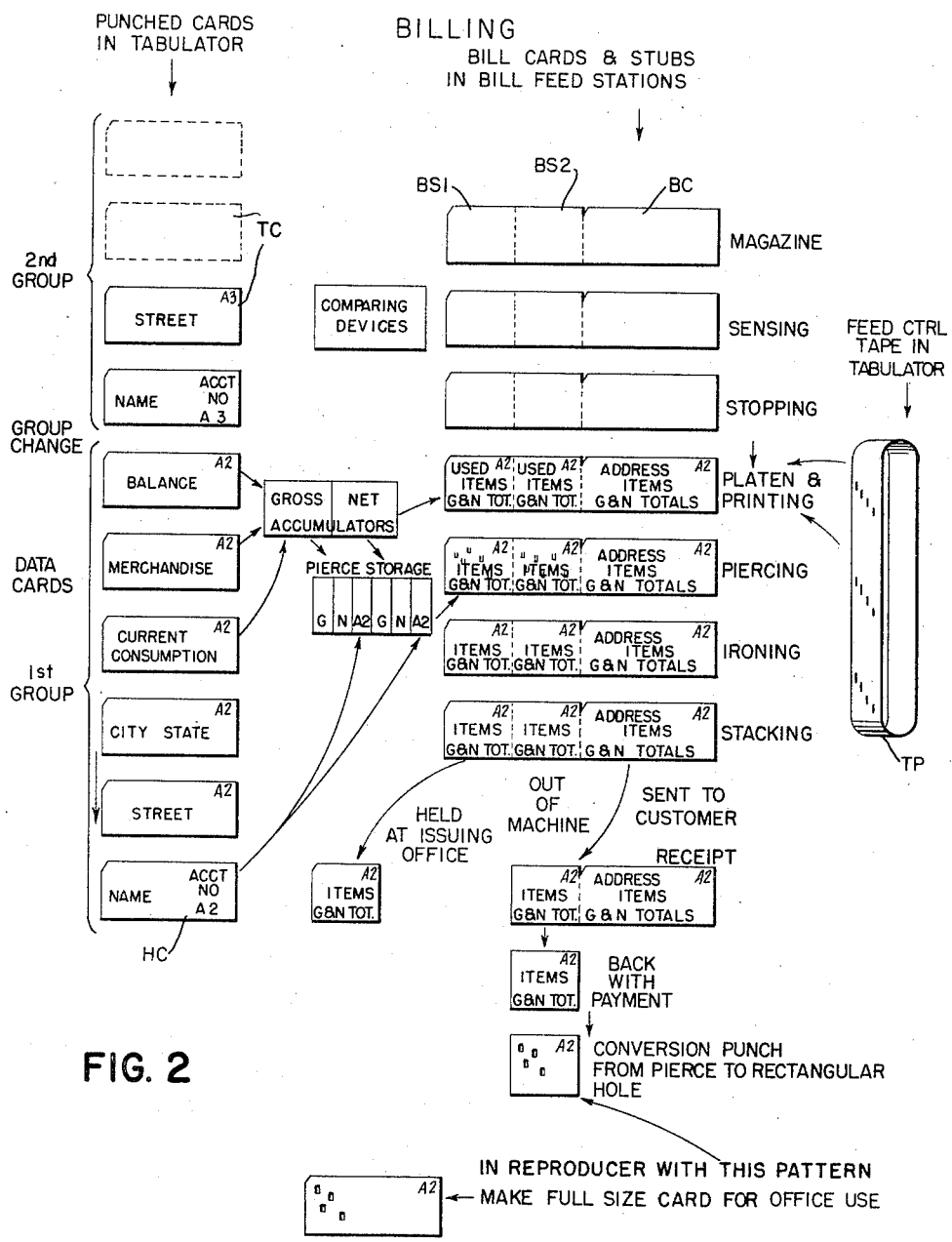
Fig. 2 is a diagrammatic view showing the various elements such as cards, bills, machine units and stations in the machines as they are interrelated for a billing operation.
Figure 3:
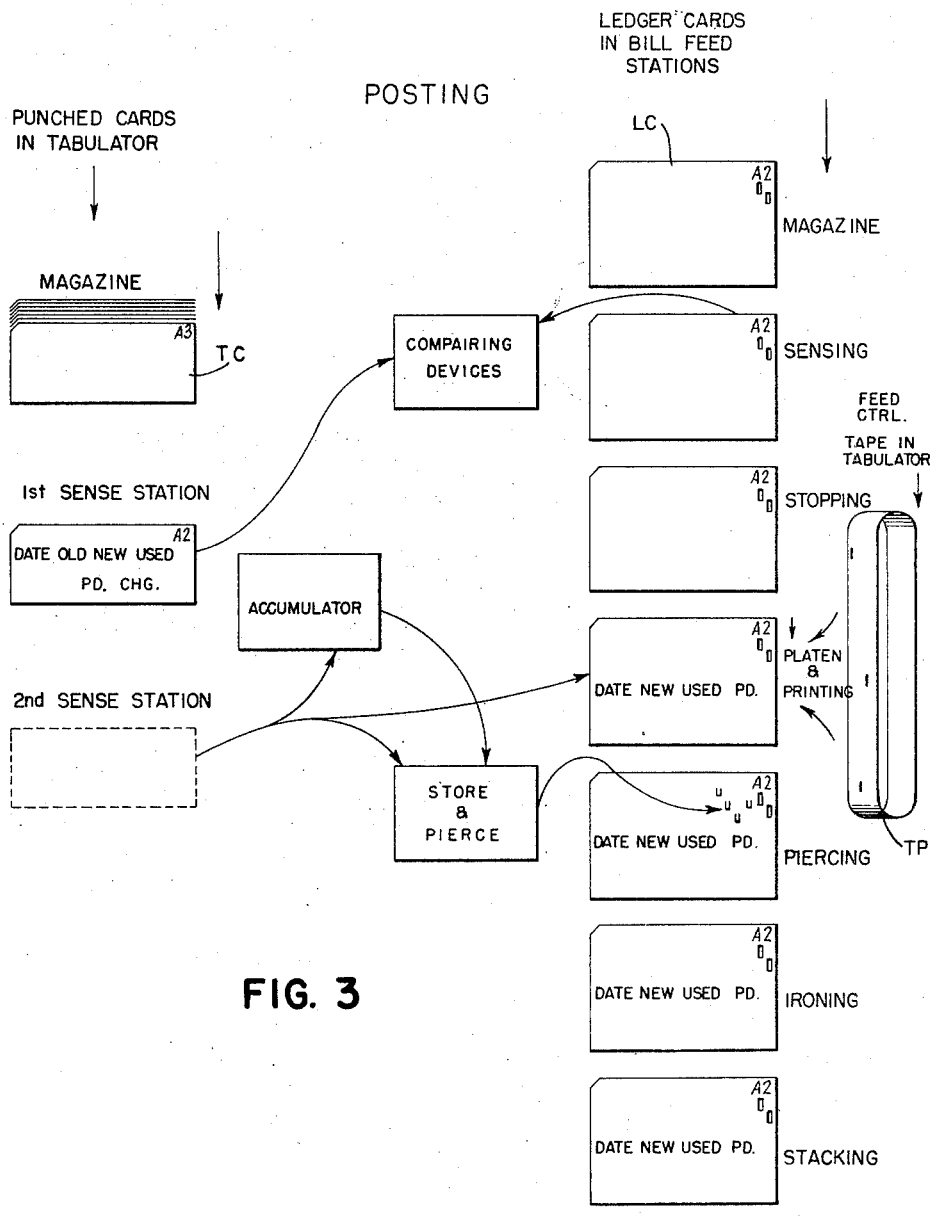
Fig. 3 is a diagrammatic view of the various elements used in the machine such as record cards, ledger cards, machine units and stations as they are interrelated for an operation such as posting.

In Figs. 2 and 3 are shown samples of the kinds of operations possible with the use of the present bill making devices. In Fig. 2 the example is one of public utility billing wherein not only are complete bills BC made for the customer, but there is also set up, pierced, and recorded, stub sections to aid in the accounting procedures of the issuing office. Fig. 3 shows a posting application wherein the bill feed devices operate upon an enlarged ledger posting card designed to aid the accounting controls of an issuing office.

In Fig. 2, the arrangement of record elements and diagrammatic representations of the various units and stations of the tabulator and bill feed device are designed to illustrate the difference between the cards of the tabulator and the cards of the bill feed and the controls thereover. At the left there is shown a series of two groups of record cards which are the ones that are passed through the tabulator in order from the bottom up. At the right center of the illustration is a number of bill cards with stub sections, said cards being placed at intervals to illustrate the various stations in the bill feeding device through which the bills pass in succession as they are completed. Although the same card is shown simultaneously at all stations, it will be realized that this is not a reality and is not the actual happening in the machine, but it is merely illustrative of the successive appearance of one bill card as it progresses from station to station.

Reading upward along the identifications of the tabulator cards at the left, it is seen that for the production of a sample bill card there may be involved, successively; name, street, city-state, current consumption, merchandise and balance cards TC, all of the same account as identified by the account number A2. This account number is perforated in the tabulator cards as is all the other information, and it is sensed by successive sensing stations in the tabulator to control the usual group control devices for detecting the end of one group and the beginning of an incoming group. The second card group A3 is shown in Fig. 2 but does not play any part in the production of the bill shown.

Before going into descriptions of the controls derived from the tabulator to have effect on the bill making devices, it is believed advisable to trace the course of the bill card as it proceeds through the bill feeding stations. Looking along the right side of the vertical progression of bill cards it is seen that they are labelled to represent the seven main stations encountered along the path of a bill as it progresses through the bill feeding device as already mentioned with reference to Fig. 1. It is noted that the successive stations are identified as magazine, sensing, stopping, printing, piercing, ironing and stacking.

In the particular problem involved in Fig. 2, when the bill reaches the second station, i.e., the sensing station, the sensing devices are ineffective because at the time it is not necessary to compare the blank bill with the related account cards of the tabulator. However, an operation of this kind will be discussed hereinafter with reference to the posting operation of Fig. 3.

Returning now to the advancement of the bill card to the stopping station and then beyond into the printing and piercing stations, it is at the latter two stations that most of the bill making controls are effected. When a bill card is brought from the stopping station to the platen and thus arranged to receive recording from the tabulator printing device, thereafter in that one station its advancement for a line spacing, long feeding and ejection is controlled no longer by the bill feeding device, but by the endless feed control tape TP in the tabulator as shown diagrammatically at the extreme right side of Fig. 2. Most of the recorded information on the bill card is derived directly from the second card sensing station of the tabulator to put the data such as name, account number, address, old meter reading, new meter reading, current used, gross charge, net charge, merchandise identification and amount, repair identification and amount, and old balance amount on the bill. As such items are read off the cards in the tabulator and used to control the printer of the tabulator, they may also be directed to set up the storage part of the piercing mechanism and also when representing amounts directed into the accumulators of the tabulator as illustrated diagrammatically by the showing of gross and net accumulators. Finally, when all items of that particular account have been sensed, as determined by the group change detected in the tabulator, then a total reading and recording operation is initiated and the total is printed near the bottom of the bill card. At the same time, the totals are read off the accumulators and stored in the piercing unit and there await the progression of the bill card into the piercing station.

In the illustrative showing, the bill form is operated upon in the piercing station to be pierced in the two stub sections of the bill form. This is done all in one stroke and the piercing storage device is again receptive of other information for an oncoming bill card. It will be noted that the piercing in such stub sections is directly over the printed matter and would have a marring effect on such matter if performed in the usual fashion to punch out rectangular holes. However, in the present device the appearance is restored to normal in the following station which is the ironing station designed to roll back all the extending flaps caused by piercing and thus restore the smooth surface of the bill card and stubs before they are thrown into the stacking station.

In order to aid in an understanding of the uses of the various portions of the bill form when it is taken out of the bill feeding device, a number of other steps are shown at the lower part of Fig. 2 to illustrate what happens to the bill portions in accordance with some accounting procedure. As illustrated, the left-hand stub portion is held at the issuing office while the main bill card section and the attached stub are sent to the customer. The customer may hold the main bill portion as a receipt or memo, or have it stamped at the office upon a receipt of cash when turning in the stub. However, in most instances, the stub is returned with a check and it is this customer's stub section which is used upon return for many subsequent accounting procedures to credit the customer's account and prepare for sending out new bills. As illustrated diagrammatically, at the lower part of Fig. 2, when a stub section is brought back it is converted into a card portion having regular rectangular holes. Then it is further converted into a full size tabulating card having rectangular holes. That card is then matched with other bill cards for sending of subsequent bills and also to control the posting of ledger records to be held at the issuing office. It is with such posting controls that the illustration in Fig. 3 is concerned.

In Fig. 3 the tabulator and bill feed controls are shown arranged to take care of ledger records in an issuing office as recorded on a large size ledger card LC under control of single account cards passed through the tabulator. The punched account cards are shown at left as they appear when stacked in a magazine and also in the positions wherein the one account card A2 is at a first sensing station before passing to the second sensing station of the tabulator. While the record card is at the first sensing station of the tabulator, the account identification A2 thereon is compared with the account identification which is pre-punched in the ledger card LC. When the ledger card arrives in the sensing station of the bill feed device, such account number perforations are sensed and are synchronized with the sensing of the punchings in the supposedly related card in the tabulator, and if the two compare then the devices are permitted to continue to function and recording is later effected on the ledger card.

The ledger card passes through the same seven successive stations of the bill feed device as already outlined in connection with bill making. The various stations are so proportioned and the magazine and the stacker made adjustable to receive the cards of an extra size as illustrated in connection with ledger posting. When the ledger card reaches the platen to receive printing, it is also controlled by the feed control tape TP of the tabulator as mentioned before. While at the platen it is recorded upon by the printing devices of the tabulator as adjusted by the card in tabulator to signify the pertinent data in connection with a ledger record such as the date, new reading, amount of current used and amount paid (this amount paid information was derived from the returned stub of Fig. 2 and put into the tabulating card of the A2 account before this ledger posting operation was started). Of course, not all the data of the card need be recorded on a ledger posted line since the card in the tabulator has other old reading and charge amount identifications which are to be used later for making out a current consumption card, but of no concern in the present example. However, when the tabulating card reaches the second sensing station, amount information therein is put into the accumulator of the tabulator at the same time that the same sensing station controls recording on the ledger card and as a third control, information derived from the second sensing station in the tabulator may be used to set up the storage portion of the piercing unit to provide pierced information such as the amount paid in data along with other amounts from the accumulator and pierced in the ledger card. After the ledger card is pierced it passes successively into the ironing and stacking stations in the usual fashion.

Order of presentation

Before describing the details of the bill feed controls, it is believed advisable to consider first the various units of mechanism or components of the tabulator machine with which the novel kind of automatic form printing device is associated. The various units to be identified include the card feeding and sensing means, the data accumulating and printing means, and the tape controlled record feeding means.

The tabulator card feeding unit is preferably of the construction fully described in Patent No. 2,510,559.

As already noted, the present invention is preferably embodied in a machine of the record controlled type wherein amounts and other numbers such as page, invoice, and account numbers are entered into an accumulator or accumulators according to the digit representations on perforated records which are passed successively through the tabulator.

Some of such entered numbers are merely stored as in the case of an account number, other numbers have a unit added thereto regularly as in the case of page and invoice numbers, still other numbers such as amounts are added to each other in a plurality of denominational orders.

The accumulator and clutch driving mechanism are preferably of the construction shown in the Lake et al., Patent No. 2,326,653.

The accumulator shown herein is provided with an electrical total readout which may be of the form shown and described in the patents to C. D. Lake et al., Nos. 2,232,006 and 2,136,636.

The present machine is provided with a printing mechanism which is adapted to print items and totals entered in the accumulator. The accumulator values are read out of the readout commutators as decimal representations and the impulses are used to control the printer.

The machine is provided also with alphabet type and the impulses transmitted by the commutators select such type to print, aside from numerals, letters composing words or abbreviations, for printing each line derived from the card analyzed.

The printing mechanism used is of the kind shown and described in detail in the patent to R. E. Page and H. S. Beattie, No. 2,436,071, dated March 16, 1948.

The feed controls for the record strip R is of the tape controlled variety such as that shown in detail in the Mills et al. Patent 2,531,885, filed on August 9, 1945 and issued on November 28, 1950.

Referring to Fig. 9, a tape control mechanism C is shown in a general way as it appears attached near the right end of platen P. Wrapped around the platen is a record card before which the type wheels 20, Fig. 1, are rotated into the printing positions. At the right end of the platen P, Fig. 4, the shaft extends into the tape control casing and ends with a pair of knobs K and K', the former having direct connections to the platen and the latter having gear connections arranged so that a vernier adjustment may be made to regulate the location of the printing line. Extending on the front of the casing is a panel holding the five manipulative controls for regulating the record sheet advancement. A knob controls the line space movements for different extents of feed and for selective line spacing under control of the tape mechanism. A second knob is provided for disabling the connections between the perforated tape unit and the platen.

The three keys extending across the top of the panel are provided to control the operation of the tape feeding unit. The key at the left is used to space the tape to bring it into a controlling position under manipulative control. The central key is a restoring control for governing the movement of the perforated tape to bring it around into the intial position. This corresponds with a prearranged normal position of the record card, so that both the record and the tape are ready to be moved in synchronism. A key at the right is used for stopping the operation of the tape control mechanism whenever desired.

The feeding controls are illustrated in coordination with a record controlled alphabet printing tabulator. In the printing of bill cards, control is exercised by a sequence of record cards arranged to print alphabetic data such as names, addresses and dates, in combination with other detail cards perforated to represent items and amounts to be recorded, accumulated, totalled and charged to the various customers. Such type of cards are shown in Figs. 2 and 3 and the cards there represented are used to control printing on other cards such as BS1, BC and LC.

Heading cards HC, Fig. 2, when found in a plurality of sets for one account group, may be distinguished by special heading group identifying perforations. These heading identifying perforations are used to select the various tape sensing brushes for determining the stopping position of the print receiving card for locating the first line of each heading or detail group.

There is further record feeding control provided in the form of X detecting devices for sensing the change from cards having heading perforations to those following details cards lacking such identification. Upon such a change of X to no X cards, the bill card is advanced to the position designated to receive the first item impression. Thereafter, when the detail records are controlling for recording, the bill is advanced in line spacing under control of the usual circuit breaker and cam contacts.

There is still further distinction between the various cards in a sequence related to more than one account. Group number perforations are used to distinguish between the cards relating to different customers. Therefore, upon the passage of the last detail card and advancement of the first heading card of the incoming group, there is detected a change in the group numbers and the machine is controlled to take a total and record the total on the predetermined total line selected by a tape perforation. After the total is printed, skipping is again initiated and limited by a tape perforation and a cooperating brush which is selected to carry the record sheet over into position to record the first heading line on the second form.

In the foregoing sections of the description, reference is mainly to known forms of card sensing, printing, accumulating and tape feed controlling mechanisms of the tabulator. In the sections to follow there is presented the novel parts of the bill feed unit including the bill card feeding, sensing and stacking devices.

*Bill Feed framework*

It is already noted with reference to Fig. 1, that the Bill Feed unit is supported on L-shaped support tubing 21 with castors. Two of such heavy pipe supports 21 are stiffened with cross bars and tied together at the base. At the upper ends of the two supports 21 (Figs. 4 and 5) there are welded slotted blocks 399 to receive and adjustably fasten heavy studs 400 extending from the main side frames 401 and 402 of the Bill Feed unit.

Figure 7:
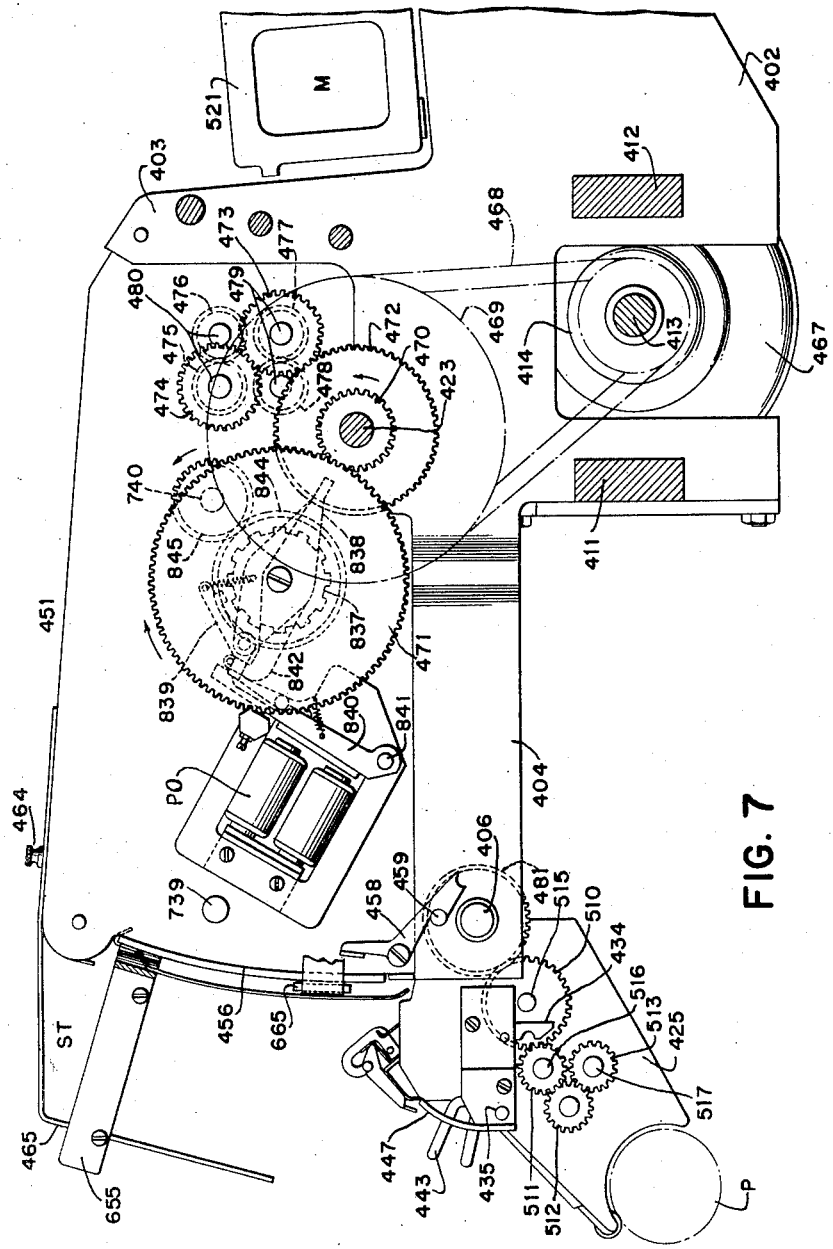
Fig. 7 is a side elevation view taken along line 7—7 in Fig. 6, and showing the driving mechanism for parts of the bill feed device.

The shape of the main frames is best shown in Fig. 7, where frame 402 is seen to have a large lower portion, an upward extension 403 and a forward horizontal extension 404 encircling the shaft 406.

Stud 400 at the left side (Fig. 5) extends from a plate 408 on a block 409 secured to the left frame. At the right side (Fig. 4) stud 400 extends from a T-shaped bridge plate 410 secured to two bars 411 (Fig. 7) and 412 spanning the gap in frame 402 for an extension of the motor shaft 413 and the pulley 414 thereon. Two safety pins 415 (Fig. 9) extend from plate 410 to prevent the unit from swinging around the pivot 400 when the "Bill Feed" with its framework is wheeled away from the printer.

The two main side frames 401 and 402 are tied together in a rigid way by a series of cross bars and plates best seen in Fig. 8. These ties include a magazine base frame 417, a throat plate 418, a motor support plate 419, a feed roller bar 420, and a die support bar 421. These parts with the frames constitute what may be called a lower frame section and they furnish a fixed base for two articulated sections, a front platen section pivoted on shaft 406 and an upper frame section pivoted on shaft 423.

The frame of the platen section (Figs. 7, 8 and 9) includes two side plates 424 and 425 tied together by a front transverse channel 426 (Fig. 8) and an upper sheet metal channel or box 427. This section is pivotally mounted on the shaft 406 and confined between the main side frame extensions 404.

A pair of handles 428 (Figs. 1 and 5) are fastened to the tops of plates 424 and 425 and these are grasped by the operator when maneuvering the Bill Feed unit over the tabulator to fit the forward section of the unit onto the paper table 429 (Fig. 8) of the tabulator and near the rear of the platen P where the usual feed rollers 430 press against the lower side of the periphery of the platen.

As the small forward section of the Bill Feed is brought over and onto the platen P, it is clamped there and through the pivoted connection to shaft 406 the whole Bill Feed is also registered with the tabulator. The parts for connecting the two machines are best shown in Figs. 13, 14 and 15.

Extending from both sides of the tabulator carriage side frames are slotted assembly guide plates 432 and latching pins 433. Cooperating with these pairs of connectors and mounted on the bill feed platen section frames are latches 434 for pins 433 and studs 435 to fit into the slots of plates 432. In Fig. 9 it is seen that a bracket 436 is fastened to side plate 424 and carries the pin 435 and the pivoted latch 434. And on the other side, as seen in Fig. 7, a bracket 437 carries a similar pin 435 and a latch 434.

In the perspective showing of Fig. 13, it is seen that the bracket 436 is adapted to carry an eccentric stud which has a large tenon 439, a small tenon 440, an eccentric portion 441 and a milled portion 442. The eccentric portion 441 is encircled by the latch 434 and the milled portion 442 is engaged by a clamping arm 443. There is also provided a compression spring 445 (Figs. 14 and 15) which is constantly pressing against the latch 434 to cause it to snap over and lock onto pin 433.

As the bill feed is being maneuvered into engagement with the carriage, the latches 434 and arms 443 are all held in the position shown in Fig. 14 which may be regarded as the preliminary latching position.

Referring to Figs. 14 and 15, there is shown a curved ratchet 447 attached to the end of the bracket 436. Between the ratchet 447 and arm 443 there is an amount of flexure and the arrangement is for biasing the ratchet teeth 448 into engagement with a tooth 449 forming a part of the arm 443. The latching and clamping means is also duplicated with respect to the right end of the bill feed as shown in Fig. 7.

The clamping action is realized when the arms 443 are raised to the position shown in Fig. 15. This action rotates the eccentrics 441 upwardly thereby drawing the latches 434 tightly against pins 433 and clamping the bill feed to the tabulator.

Returning to consideration of more of the framework, the upper section pivoted on shaft 423 (Fig. 8) holds the bill piercing and ironing devices as well as part of the belting for carrying the bill cards to the stacker. This upper section is held between two large side plates 450 and 451 (Fig. 6) which are pivoted on shaft 423 and held together by a series of cross members such as heavy bars 452 and 453, the pierce unit support bars 454 and 455, and a curved front sheet 456.

Figure 5:
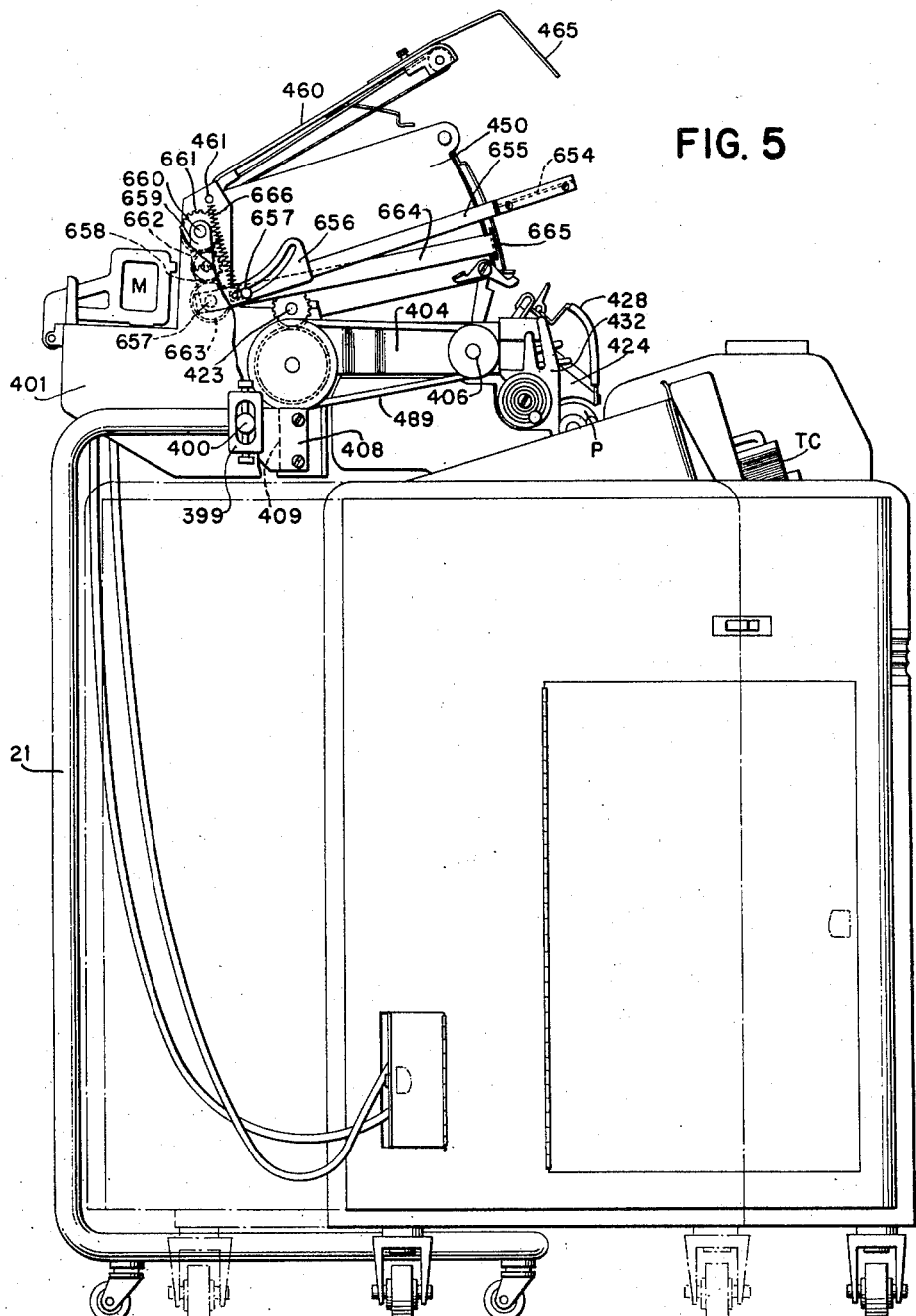
Fig. 5 is another side elevation view of the printer and assembled bill feeding device, the latter being shown with some of the units unlatched and raised in a position making them accessible for inspection and servicing.

A latch 458 (Fig. 7) pivoted on the side of plate 451 serves to engage a pin 459 on the lower section 404 and lock down the upper section. However, this latch may be rocked and the upper section released and lifted and held so by putting the curved end of latch 458 on top of pin 459. Then the parts appear as shown in Fig. 5 with all sections opened for inspection, repair and removal of cards in a jam. There it is also noted that the top or cover plate 460 is pivoted at 461 and swung up with respect to the upper section frames 450, 451.

This top plate 460 finds use not only as a swinging cover but also is the mounting for a series of inner brackets 462 on which are pivoted the stacker rollers 463 for the feed belts B. And to the top of cover 460 is adjustably secured by thumb screws 464 a thin sheet with forwardly and downwardly extending stacker stop fingers 465.

The drive mechanisms

Referring to Fig. 8, it is seen that a bill feed operating motor 467 is secured to the rear of plate 419. The shaft 413 of the motor extends outside the left main frame 402 (Fig. 7) and there carries a pulley 414 with a belt 468 driving a large pulley 469 fastened to shaft 423. Also fastened to shaft 423 is a small gear 470 in mesh with a large gear 471 for driving the clutch which selectively operates the piercing device to depress the pierce wires through the bill and for restoring the wires as noted hereinafter.

Also fastened to shaft 423 is a gear 472 for driving a train of gearing 473, 474, 475 and 476, also 477 and 478 fastened to the pairs of ironing roller shafts 479 and 480.

Drive shaft 423 extends across the entire bill feed unit and projects from the right side (Fig. 9) where it carries a pair of fixed gears 482 and 483. The former drives a large idler 484 which in turn meshes with the large clutch gear 485 of the clutch which operates parts of the piercing unit to shift the digit slides sequentially and also for depressing the offset wire bails to act in effect as the piercing set up actuator.

Gear 483 drives a gear 486 connected to a pulley 487 which drives a pulley 488 and shaft 406 by means of belt 489. In Fig. 8 it is seen that shaft 406 carries a series of pulleys 490 around which are wrapped the front ends of the six long endless belts B which carry the bill cards through the bill feed.

At the end of shaft 406 opposite the end with pulley 488 is attached a gear 481 (Fig. 7) which drives a train of gearing 510, 511, 512 and 513 for operating the feed shafts 515, 516, and 517 also shown near the platen P in Fig. 8.

Gear 486 (Fig. 9) also effects other drives by causing rotation of gear 491 which is loosely mounted on shaft 498 but coupled with a pinion 492 meshing with the drive gear 493 of the picker feed clutch. When the clutch is effective, a gear 494 is driven and it in turn drives the pinion 495 which acts as a crank for the picker linkage 496 and 497. Pinion 495 is fixed to shaft 498 and drives it whenever the magazine feed operates and thus causes a sensing operation as revealed more fully hereinafter.

Gear 494 also drives a gear 500 with a connected gear 499, all of which are loosely pivoted on a stud 501. A pair of shafts 502 and 503 near the throat of magazine M carries feed rollers and also carries meshing feed pinions 504 and 505, the latter of which is driven by gear 499. Gear 499 also meshes with an idler pinion 506 for driving a pinion 507 on another feed shaft 508. In Fig. 8 it is observed that the shafts 502, 503 and 508 carry feed rollers for conducting an issued bill card beyond the magazine M.

The advance of bill cards

Figure 6:
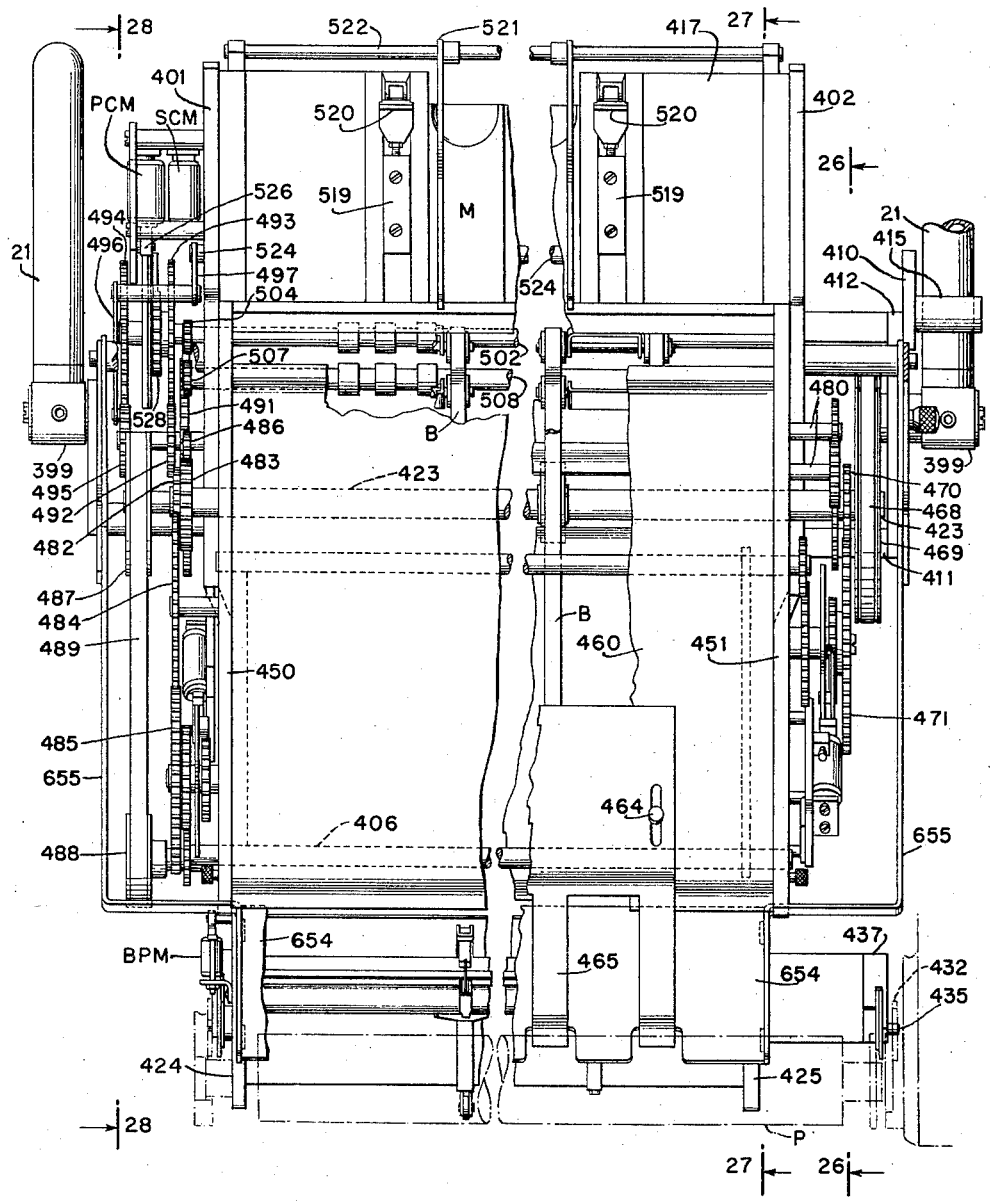
Fig. 6 is a plan view of the bill feeding device with a section cut out to show a feed conveyor belt.

In Figs. 6 and 8 it is seen that the bill card magazine M has the base plate 417 for supporting a series of slides 519 with picker knives 520 for engaging the edge of the bottom card and feeding the cards singly and successively in the bill feed. A pair of side wall members 521 are adjustable along a horizontal rod 522 to confine cards of single, double, or fractional widths such as extra length bills with portions of cards as stubs. Operating sectors 523 are fastened to a shaft 524 (Fig. 9) which is at the end of the picker drive linkage 496 and 497 mentioned hereinbefore. On every revolution of gear 495, the sectors are rocked and slides 519 (Fig. 8) are reciprocated to pick off the bottom card and move it to the left between the feed rollers on shafts 502 and 503.

Picker operation is magnetic clutch controlled and dependent upon energization of clutch magnet PCM (Fig. 9) which rocks armature lever 526 and permits engagement of a pawl 527 pivoted on a double winged stop appendage of gear 494 with the notched disk 528 secured to gear 493. When so connected, the clutch provides a driving train from the gear 491 to the gear 495 acting as a crank for the linkage 496, 497 to rock shaft 524 and operate the picker.

Behind the picker clutch PCM, 527, 528 is a similar sensing unit clutch with a magnet SCM and parts duplicating the picker clutch parts, the only difference is that the clutch disk which is also fastened to gear 493 operates a clutch pawl on a gear 494a which is in mesh with a pinion 495a behind gear 491 and fastened to shaft 498 to drive it.

In Fig. 9a it is seen that pawl 527 is pivotally mounted on the inside of the double armed clutch connecting lever 529 which is loosely pivoted on stud 530 but attached to the driven clutch gear 494. Alongside pawl 527 and loosely pivoted on stud 530 is a pawl release lever 531 also double armed and provided with an extending pin 532 which underlies the short extension of pawl 527. A spring 533 tends to pull the pawl towards the clutch disk, but normally the pawl is held out by pin 532 because said pin is on lever 531 which along with lever 529 is held latched up by armature latch 526. When released, levers 529 and 531 are separated slightly because pawl 527 presses down on pin 532 and rocks the levers apart until at the half revolution mark when one or the other of the pairs of extending lever points are engaged by latch 526 which first engages lever 531 to rock the lever and act through pin 532 to rock the pawl disengaged, and next engages lever 529 to stop the driven parts including gear 494.

It is already noted that gear 494 drives gear 495 which is the driver of shaft 498 and also a crank for the picker feed to issue a bill card out of the magazine.

Upon emerging from the magazine M (Fig. 8) the bill card is fed into a first pair of feed rollers on shafts 502 and 503 which are driven by gears 504 and 505 (Fig. 9) as already noted as being rotated during card feeding operations. Both roller shafts are journalled in the side frames 401 and 402 (Fig. 6). The rollers on the upper shaft 502 (Fig. 8) are pressed down against the lower rollers by compression bearing springs (not shown) to maintain the two in firm engagement with the card.

Following the first set of feed rollers, there is a second set of rollers, the upper rollers being on shaft 508 which is journalled in the side frames 401 and 402, and on which are attached the roll portions which are in cooperation with the small lower feed rollers 509. As shown in Fig. 8, each roller 509 is carried on an arm 514 which has a bearing surface embracing the feed roll shaft 503. The arm 514 is urged in the direction of the upper feed roller by means of a spring 518. From these feed rollers the bill card is fed into the sensing station S, later to be separately described, and held therein until another feed cycle is signalled.

During the closing portion of the feed cycle the card enters the sensing station S and is arrested therein by a card stop 535. The card feed cycle terminates shortly thereafter with the card in position for sensing, the front edge of the card being held against the card stop and the trailing portions of the card being held between the rolls 508 and 509. The sensing cycle is then initiated and towards the closing portion thereof, the card stop 535 is retracted below the card line to allow passage of the card which will be moved by the rolls 508 and 509 upon initiation of the immediate next card feed cycle. After leaving the sensing station, the card is fed into the carrier system which conveys the card to the bill positioning station located just short of reaching the carrier platen P.

The card stop mechanism at the sensing station S includes the stop bail 535 (Fig. 8) which has side arms encircling the shaft 536 and an extension to which is attached a spring 537. To another extension of bail 535 there is articulated the upper end of a link 538 which at its lower end is pivotally connected to a cam follower lever 539 loosely mounted on shaft 540. At the opposite end of lever 539 is a roller 514 which rests on the cam 542 rotated by shaft 498 and shaped to raise the roller at the end of each card sensing operation so that lever 539 is rocked counterclockwise and link 538 and bail 535 are lowered to allow the card to move to the left.

Directly behind the card stop 535 are the pair of feed rollers 543 and 544, the former being one of a series of such rollers for guiding the belts B and the latter pressing against the belt as held by a lever 545 loosely pivoted on shaft 536 and urged upward by a spring 546. When the stop 535 is withdrawn, the rollers 508 and 509 become effective again to move the card slightly to the left where its front edge is caught between the constantly moving belts B and cooperating rollers 544 to move the card toward the platen.

Referring to Figs. 1 and 8, it is noted that the belt carrier system comprises a series of six endless belts B in cooperation with feed and guide rollers. As shown in Fig. 8 these endless belts cooperate with rollers numbered from 543 to 553, inclusive, which merely rest on the belts to advance the cards. Of these nine sets of rollers, the first three sets 543–547 are pivoted in blocks secured to the underside of a guide plate 559 attached between forward frame extension 404 in a position to press the rollers upward against the underside of belts B. A somewhat similar guide plate 560 is attached to the lower edges of the upper section frames 450 and 451 and serves to guide cards through the piercing unit. Guide plate 560 is slotted to allow rollers 548, which are loosely mounted in blocks 561, to descend into contact with belts B. It is also slotted to permit sliding action of rollers 549 for selective feeding of a card out of the piercing unit as explained hereinafter. Feed rollers 550 are on blocks secured to the top of guide plates 560. The other three sets of feed rollers 551–553 are pivotally mounted in blocks secured to the underside of a guide plate 562 fastened between the tops of the upper section frames 450 and 451 and situated so as to press the rollers against the underside of the stacking loops of the belts B.

As noted hereinbefore, the belts B are driven by gear and pulley connections to shaft 406 as seen in Fig. 28. The drive wheels 490 (Fig. 8) on shaft 406 are only one set of a series of sets of wheels or pulleys around which the belts B are drawn to conduct the cards along the bill feed path. Such guide wheels include 543, 490, 564—570, 463, 571 and 572 in order of appearance from the exit end of the sensing unit S and back there again.

Returning to consideration of the movement of the card after leaving the sensing station S, it is noted in Fig. 8 that beyond rollers 543 and 544 the card is carried toward the platen by belts B as aided by rollers 545, 546, and 547.

The forwardly extending part of the bill carrier system is seen to be located between the belt drive shaft 406 (Fig. 10) and the tabulator platen P. This part of the system is used to convey the bill to and from the carriage platen P. It is articulated for a short pivoting movement to provide the flexibility needed to place it directly above, and coordinated with, the platen paper table 431 of the tabulator. Referring to Fig. 7, it is seen that the rear edge of frame 437 is spaced near the straight front end of frame 404 and thus a limit stop is provided for movement of the small forward appendage with respect to the remainder of the bill feed device.

After leaving the sensing station S (Fig. 8) the bill is carried forward by means of the belts and rollers 545, 546 and 547. From this last roll 547 the bill is directed to the bill positioning station located just prior to the tape carriage platen P where the bill is arrested and held by means of a gate 563 (Fig. 10) until the platen is ready to receive it for the carriage.

For guiding the bill to and from the carriage platen, card guides 575, 576, 577 and 578 are provided. These guides are secured by screws to the end frames 424, 425 and channel member 426.

For transporting the bill to and from the platen P (Fig. 10) feed rolls 555, 556, 557 and 558 are provided, and of these 556 and 558 are urged into operation by springs and are thereby driven by friction. The rolls 555 and 557 are provided with respective gears 513 and 511 (Fig. 7) both in mesh with an idler gear 512. Motion to gear 511 is supplied by a gear 510 secured to a shaft 515 journalled in the side frames 424 and 425. Gear 510, in turn, meshes with the gear 481 secured to the shaft 406 which rotates in the manner earlier described.

The feed roll shaft 517 (Fig. 10) carries a series of the rubber covered brass rollers 555 separated from one another by means of spacers. The pressure exerted by the cooperating rollers 556 causes friction between the brass rollers and the cooperating shaft 517 which is continually running. This arrangement of individual rollers insures the even impositive feeding of the bill card against the stop gate 563 forming a part of the positioning station to be described. Pressure rollers 556 are pivotally supported by spring urged arms 554 pivoted at 573 on brackets under plate 575. A card lever 579 is used to close contacts 580 to indicate the presence of a bill card at the station where it presses against gate 563 preparatory to going around the platen.

There is also a frictional drive effecting the rotation of the feed rolls carried by shaft 516. Here the feed roll proper is a rubber roll 557 freely carried by the shaft 516 and driven therefrom by means of a friction arrangement comprising a compression spring pressing against a flange forming a part of the feed roller, and another flange forming a part of the driving shaft 516.

Bill positioning devices

As the bill card is advanced beyond the belts B, (Fig. 10), and carried to the left by rollers 555, 556, it is stopped short of the platen P by the gate 563. Pressure feed rollers 430 and gate 563 are made effective in alternation so that when the gate is raised to stop the bill the rollers are lowered away from the platen. At the proper time for feeding the bill, the positions are reversed so that the gate 563 is lowered out of the way while the pressure rollers 430 are raised to engage the bill with the platen which then turns to position it for print impression reception. Control over the gate and pressure rollers is exercised by a bill positioning magnet BPM, a clutch controlled thereby, and a train of parts shown in Figs. 10, 11 and 12.

A bracket 582 (Fig. 10) for supporting magnet BPM is mounted on the outside of side frame 424. Cooperating with the magnet is an armature 583 which is fastened to a shaft 584 that is pivoted in frame 424 and carries on its inner end a clutch release stem 585. Wound around a collar between stem 585 and detent 587 loosely pivoted on shaft 584 is a coil spring 586 which tends to swing the detent towards the stem at all times. The stem releases the driving part of a clutch and the detent holds the driven part of the clutch.

Figures 11, 12:
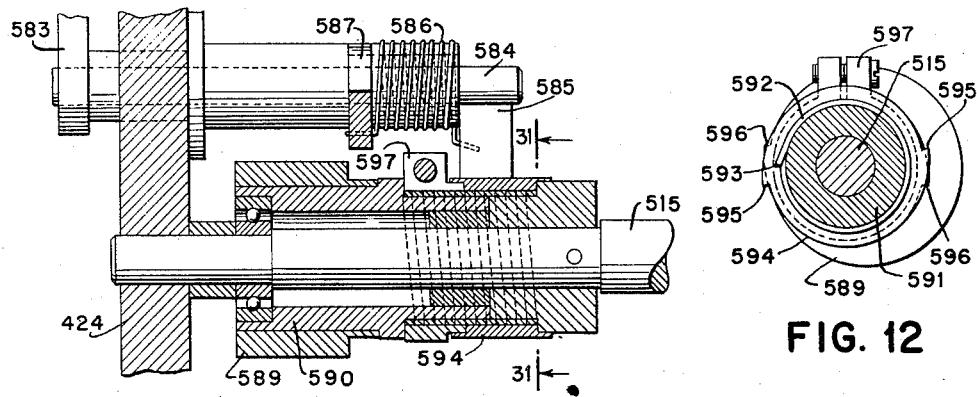
Fig. 11 is a sectional detailed view of the spacing control clutch comprising a spring drive for the cam operating the stop for the bill sheet as it approaches the platen.
Fig. 12 is a sectional view of the clutch shaft and spring as shown along line 12—12 in Fig. 11.

Referring to Fig. 11, the cam clutch arrangement comprises a cam 589 attached to a sleeve 590 journalled on two bearings both of which are carried loosely on the continually running shaft 515 which extends into frame 424. A shouldered collar 591 is pinned to and thereby driven with shaft 515. A coil clamping spring 592 encircles both the collar 591 and the sleeve 590. The right end of the spring, as seen in Fig. 12, engages a recess 593 formed in a collar 594 encircling the spring, said collar being provided with a pair of latching teeth 595 disposed for engagement with the stem 585. A similar pair of latching teeth 596 is provided on the cam 589 but disposed oppositely for detenting action with the detent 587. A clamp 597 is tightened around the left end of spring 592 to fasten it to the right end of the sleeve 590.

When both detent and stem are engaged, the condition attending detent latching is a partial overthrow which causes the coil to expand accordingly and thereby free itself from the periphery of the cooperating collar 591.

The bill positioning magnet BPM is energized to trip the clutch for a half turn of cam 589 to stop the bill and later energized a second time to again trip the clutch to bring cam 589 around back to the home position whereby the bill is released to advance around the platen P. When the magnet is energized, the armature 583 is rocked counterclockwise, stem 585 is disengaged and the tension of the spring 592 causes a contraction thereof, causing a gripping action between the spring and the collar 591. The motion from the collar is then imparted by means of the spring to the cam 589 which operates an arm 598 extending down into the carriage to operate the pressure rollers and gate.

Arm 598 carries on its upper end a roller 599 which is pressed to the right against cam 589. At the lower end, arm 598 is attached to a shaft 600 which also carries affixed thereon a series of arms 601 with studs 602 for rocking down arms 603 to lower the pressure rollers 430 pivoted thereon out of action. Springs 604 tend to hold the rollers in action and arm 598 in operation. Also fixed to shaft 600 is an arm 605 with a pin 606 for operating the gate controlling crank comprising a shaft 607 with an arm 608 pressing against pin 606 and a connected pair of arms 609 which carry pivoted at 610 on the end, the gate 563 which is rocked by a spring 611 against an adjustable stop screw 612.

The crank comprising arms 608 and 609 is prevented from rocking too far clockwise under the urging of a spring 614 by means of an adjustable stop screw 615 on a third arm 616 fixed to shaft 607, said screw 615 abutting against a tab 617 on a part 618 spanning shaft 607 and an upper shaft 619.

Figure 10:
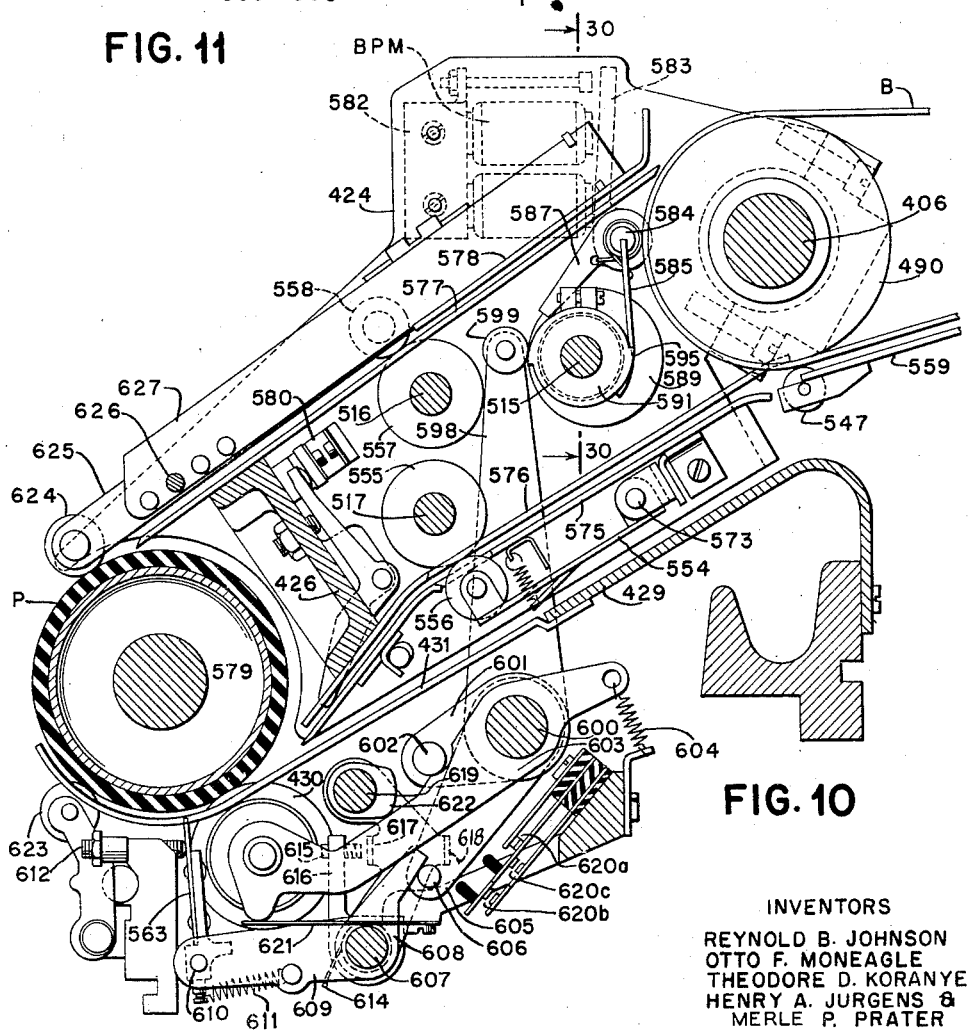
Fig. 10 is a sectional detailed view of the portion of the bill feeding device extending to the rear of the platen of the printer.

In review it may be noted in Fig. 10, that when magnet BPM is first energized, the clutch is engaged to turn cam 589 for 180°, and it thereby rocks arm 598 to the left and depresses arms 601 and 605. The one arm lowers the pressure rollers 430 while the other arm allows the gate 563 to rise to an effective bill stopping position. A second energization of the magnet causes a return clockwise movement of arm 598 and consequent lowering of the gate and reengagement of the pressure rollers since it is then time to advance the bill around the platen.

Leaf springs 621 are provided to press under arms 603 to cause a quick return of rollers 430 to feed position upon the release of operating arm 598 for clockwise movement.

When the tape controlled carriage is set up for continuous form feeding independently of the bill feed unit, then the rollers 430 are normally held disengaged from the platen by means of a series of cams 622 on shaft 619, the shaft being manually positioned by a lever, not shown, attached to said shaft.

The parts below paper table 431 are in the tabulator and remain there when the bill feed unit is removed.

Bill card spacing at the platen

Once the bill card is on the platen P (Fig. 10) and held thereon by pressure rollers 430 and smaller advanced pressure rollers 623, it then partakes of the line spacing, spacing skipping and ejection control movements of the platen as imparted by the tape controlled feed mechanism which is described hereinbefore under several headings starting with "Tape Control of Sheet Feed." It is believed sufficient to note here that any desired heading, item, body or total line on the bill or check form may be brought to the printing line automatically under control of the perforated feed control tape.

As the bill card is guided around the platen by rollers 430 and 623, it is guided still further by several small rollers 624 which are in adjustable holders 625 settable along the top of the platen to direct the leading card edge between guide plates 577 and 578.

The roller holder 625 is provided with trunnions 626 (Fig. 8) fitting into one of several pairs of side holes in a sleeve 627 which is slidable laterally along the length of the platen and under the cross member 427. Sleeve 627 is guided along under member 427 by a notched extension engaging under one wall of the member. An upstanding rearward extension 628 of sleeve 627 is notched to engage a manipulative means comprising a pair of articulated toggle arms 629 and 630 which can be folded to clamp on an angle 631 fastened to the side of member 427.

Figure 4:
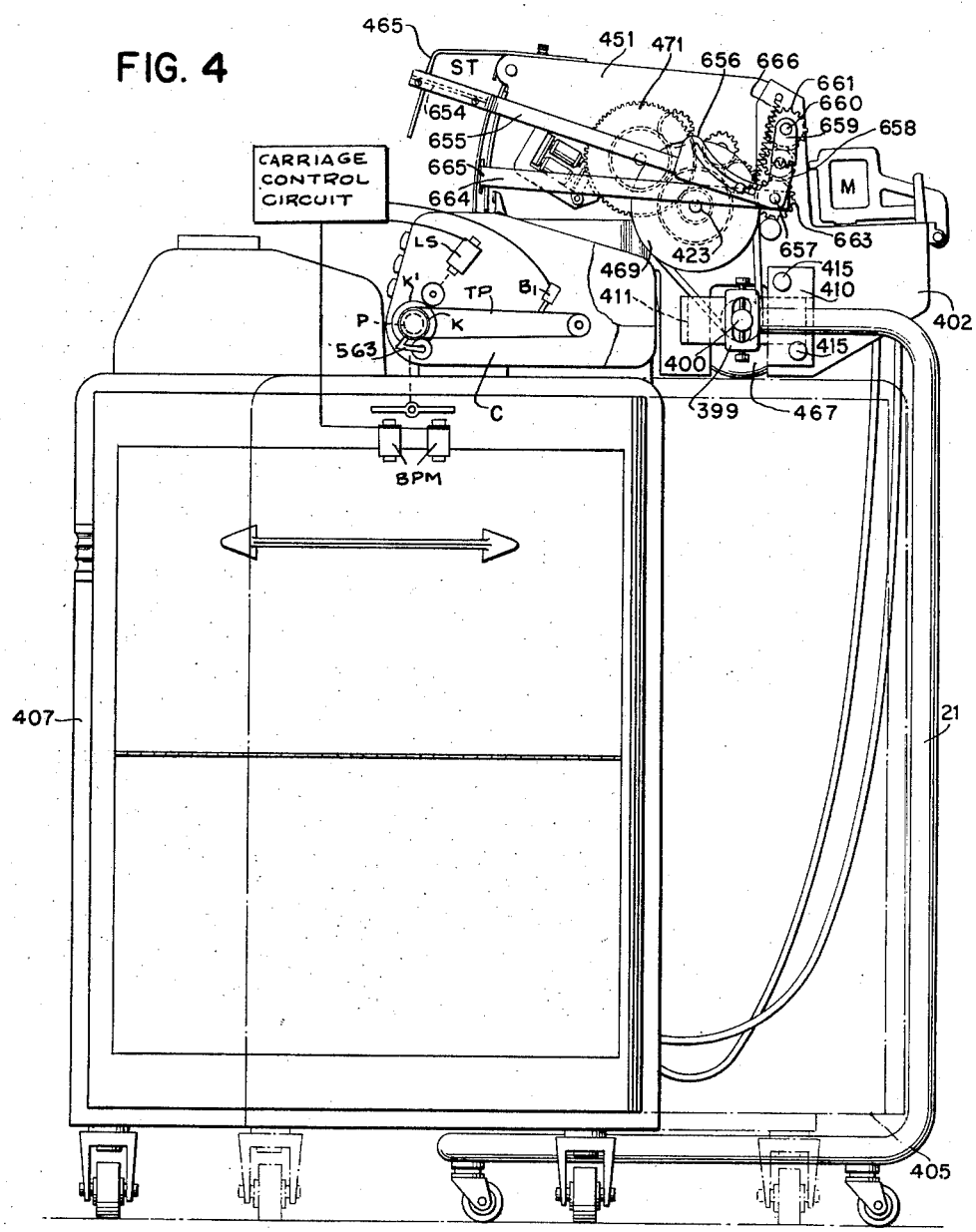
Fig. 4 is a side elevation view showing the assembled printer and bill feeding device, and illustrating some of the bill feed driving mechanisms.

Reference is made to Fig. 4 which shows a tape TP for movement past brushes B1. Magnets BPM are under control of the carriage control circuit to operate a gate 563 at a predetermined time to align the leading edge of a bill that is to be incrementally advanced around the platen P. The means for incrementally advancing the platen P and bill is shown schematically at K' and K, which is under control of the line spacing magnet LS. This magnet is controlled by pulses received from the carriage control circuit. Greater detail of the carriage control circuit is shown in Fig. 54c, advancing means K, K' and line space magnet LS in Fig. 16, brushes B1 and tape TP in Fig. 22 of copending application Serial No. 362,711, filed June 19, 1953, now Patent No. 2,889,110, of which this application is a division.

When a bill has been ejected from the platen P, a signal is received from the carriage control circuit to feed the next bill to gate 563. Then the carriage control circuit pulses magnet BPM to lower the gate 563 to permit the next bill which has been positioned at the gate to move to the platen. Also, the tape TP is returned to its starting position so that the tape and platen (along with the next bill) move in synchronism. The carriage control circuit then pulses the line spacing magnet intermittently to advance the bill intermittently, through clutching, around on the platen P.

Continuation of the belt feed

When advanced beyond rollers 624 and the platen, the card is engaged between feed rollers 557 and 558 which direct it further upward and to the right into the bight between rollers 548 and belts B, whereupon the belts take over to carry the card for the remainder of the travel to the stacker.

It is noted hereinbefore how the bill card is stopped at the sensing station S and held also at the positioning point just short of the platen. Now it is to be considered how the card is advanced to, but stopped at, the piercing station shortly after going to the right of rolls 548 and 549. Rollers 549 are mounted at a position just over the point where belt B is diverted downward around roller 565. Therefore, when the bill card is advanced against a stop 633 it is almost entirely free of the belt drive, and there is only a slight urging of it against stop 633 by roller 549 and belts B stroking at the trailing end, so that after a card is brought to the piercing position it is allowed to remain immovable during piercing before it is engaged by a feed pawl 638 which is shifted forward into contact therewith to push it toward the exit of the piercing station.

In Fig. 10 it is seen that the stop 633 is one of several such members fastened to a shaft 634 loosely pivoted in the side frames and urged into the stopping position by a spring. One of the stops is formed with a downwardly extending hook 636 in cooperation with the end of a stop retraction lever 639 which is pivoted at 640 and formed with an armature piece 641 directly under the stop retracting magnet SRM.

After piercing has been effected, magnet SRM is energized and it causes lever 639 to rock clockwise about pivot 640 and press down on hook 636 to rock shaft 634 counterclockwise and lower all stop abutments 633 to open the path for bill card advancement.

Shortly after the stops 633 are removed, the rear end of the card is engaged by feed pawl 638 which pushes it to the right and into engagement with feed roller 550 and belts B, which carry it further into the machine. The feed pawl 638 is mounted as a slide and has a notch with which is articulated the stud 643 on the lower end of an operating lever 644 pivoted on shaft 645. At the top end of lever 644 there is a roller which cooperates with a cam 646 that is rotated for each piercing cycle and formed with a raised portion to rock the lever counterclockwise late in each cycle and thereby operate pawl 638.

After leaving the piercing station (Fig. 8) the bill card is carried over to the right and under feed roller 567 where it is deflected upward by a card guide 647 to the ironing station IR.

As explained hereinbefore with reference to Fig. 7, the pairs of ironing roller shafts 479 and 480 are geared together and driven by a gear 472 to rotate continuously in a direction (Fig. 8) to elevate a card caught between feed roller pairs 649 and 650 on shafts 479 and 480. As the card passes pressure is exerted thereon by rollers 649, 650 and the extending flaps or chads of the pierced card index points are ironed back into the planes of the card faces to make them substantially level and flat. There is a condition after piercing wherein the small pierced flaps 651 extend almost at right angles to the surface of the card. As the card passes through the ironing rollers the flaps are pressed or ironed back into the holes they left behind when pierced. Then the card presents a smooth unmarred appearance, and yet points of weakness are at all pierced points and are later susceptible to sensing and regular punching when appearance no longer matters.

While being elevated above the top ironing rollers 650 (Fig. 8) the card encounters a deflector 652 which directs it between the belts B and large feed rollers 570. Then the card is carried to the left between the belts B and the long card table 562, there being spaced sets of rollers 551, 552 and 553 cooperating with the belts to conduct the card all the way over into the stacker ST.

The stacker

Referring to Figs. 4, 5 and 6–8, there is shown a stacker plate 654 carried by a pair of arms 655 disposed on either end thereof. In Fig. 5, the front arm 655 is shown attached to a fulcrum member 656 carried on a stud shaft 657 conveniently attached to the side frames. A sector member 658 also encircles said shaft 657 and is attached to said member 656. The sector 658, in turn, meshes with another sector 659 attached to a shaft 660 journalled in the side frames and having an arrangement on the opposite end duplicating that just explained. A gear 661 is also attached to said shaft 660 and meshes with an idler 662, in turn meshed with another gear 663 which is free on shaft 657 but fastened to a bail arm 664, the opposite end of said arm 664 being attached to a bail 665. It may be appreciated from Figs. 4 and 6 that the elements described are duplicated on the other end of the bill feed. The bail 665 acts as counterbalance which is applied through the gear train described against the weight of the stacker. For every card entered upon the stacker plate there is a corresponding change in the positions of the stacker plate 654 and balance bail 665.

There is also provided an adjustment for maintaining the proper balance between said balance bail and stacker for every type of bill that may be processed through the bill feed. This adjustment (Fig. 5) comprises a tension spring 666 attached on one end to a rod 461 secured to the frame of the machine and the other end is attached to a stud carried on a block 667 which is adjustably disposed and fastened in a slot formed in the arm member 656.

The several preceding sections of this specification deal with the advance of the bill card from the magazine to the stacker. During such an advance the card is stopped twice, first at the sensing station S (Fig. 8) and second at the piercing station PC.

Referring to Fig. 8, there is shown supported on block 421 the means for stopping the bill card BC in the piercing unit. This means includes the card stop 633 attached by screws to a shaft whose end portions, not shown, are suitably journalled in the side frames of the bill feed unit. A spring is adapted to bias and thereby project the stop 633 into a card stopping position. The stop is provided with a latch portion adapted for cooperation with an extended portion forming a part of an armature suitably pivoted and disposed for cooperation with a controlling magnet assembly SRM suitably attached to the framework of the bill feed unit. Energization of said magnet SRM after piercing has been effected causes the stop 633 to be retracted below the card path over belts B, thereby enabling free passage of the card BC into the feed rolls 550 and the cooperating belts B which carry it to the right and out of the piercing unit.

There is also provided a means for feeding the card out of the piercing unit after a piercing operation providing the card stop 633 is in an ineffective position. This feeding means comprises the card pusher 638 having a socket end portion removably encircling a stud 643 attached to the arm 644 carried freely on the shaft 645 suitably journalled in the side frames of the piercing unit. A roller is carried by the arm and is disposed for cooperation with a cam 646 attached to the shaft 739. The feed point of pusher 638 is sufficiently blunted to ride over the card and ride up against leaf spring 648 whenever the card is obstructed by stop 633 which remains effective during all set up cycles except one accompanied by a final piercing operation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for operating on a record sheet, a feed control tape with indicia for controlling the positioning of said sheet, means for advancing said sheet and said tape in synchronism, means for operating said advancing means, means for sensing said indicia, means under control of said sensing means to disable said operating means to stop said sheet in predetermined positions, a removable sheet issuing means comprising a magazine for holding sheets, the magazine being positioned ahead of the advancing means, means for feeding the sheets singly and successively out of the magazine toward the advancing means, a gate between said magazine and said advancing means for stopping an issued sheet, a gate operating means coordinated through circuit means with said advancing means to lower the gate to free the sheet for operation by the advancing means.

2. A machine of the kind set forth in claim 1, wherein said magazine is adjustable to receive sheets of differing size, and a frictional sheet feeding means spaced from said gate but close enough to engage a sheet of the shortest length, whereby sheets of any size are held with the forward ends in the same initial position against the gate and ready for coordination with the operation of the advancing means when the gate is lowered.

References Cited in the file of this patent

UNITED STATES PATENTS

| | | |
|---|---|---|
| 708,595 | Sinnott | Sept. 9, 1902 |
| 1,014,819 | Fenlason | Jan. 16, 1912 |
| 1,133,352 | Wood | Mar. 30, 1915 |
| 2,016,709 | Eichenauer | Oct. 8, 1935 |
| 2,063,486 | Carroll | Dec. 8, 1936 |
| 2,258,880 | Bobst | Oct. 14, 1941 |
| 2,585,076 | Bandura et al. | Feb. 12, 1952 |
| 2,606,478 | Pratt et al. | Aug. 12, 1952 |
| 2,615,551 | Mills et al. | Oct. 28, 1952 |
| 2,615,569 | Lake et al. | Oct. 28, 1952 |
| 2,662,355 | Ross | Dec. 15, 1953 |
| 2,792,223 | Klippel | May 14, 1957 |
| 2,831,681 | Gentry | Apr. 22, 1958 |